United States Patent [19]
Kurihara et al.

[11] Patent Number: 5,876,682
[45] Date of Patent: Mar. 2, 1999

[54] NANOSTRUCTURED CERAMIC NITRIDE POWDERS AND A METHOD OF MAKING THE SAME

[75] Inventors: Lynn K. Kurihara, Alexandria, Va.; Gan-Moog Chow, Bowie, Md.; Paul E. Schoen, Alexandria, Va.

[73] Assignee: The United States of America as represented by the Secretary of the Navy, Washington, D.C.

[21] Appl. No.: 805,529

[22] Filed: Feb. 25, 1997

[51] Int. Cl.$^6$ .......................... C01B 21/068; C01B 21/06; C01B 21/076; C01B 21/072
[52] U.S. Cl. .......................... 426/344; 423/409; 423/411; 423/412
[58] Field of Search ................................ 423/409, 412, 423/344, 411

[56] References Cited

U.S. PATENT DOCUMENTS

| | | |
|---|---|---|
| Re. 31,788 | 1/1985 | Iwai et al. ................................ 423/290 |
| 4,866,012 | 9/1989 | Silverman ................................ 501/90 |
| 4,929,433 | 5/1990 | Hexemer, Jr. ............................. 423/411 |
| 4,975,260 | 12/1990 | Imai et al. ............................... 423/412 |
| 4,985,225 | 1/1991 | Hashimoto et al. ...................... 423/412 |
| 5,110,575 | 5/1992 | Wakimura et al. ...................... 423/412 |
| 5,246,683 | 9/1993 | Parent et al. ............................. 423/412 |

FOREIGN PATENT DOCUMENTS 420718  4/1991  European Pat. Off. ............... 423/411

OTHER PUBLICATIONS

IWAMA et al. "Ultrafine Powders of Tin and ALN Produced by a Reactive Gas Evaporation Technique with Electron Beam Heating." *Journal of Crystal Growth* 56(1982) 265–269. North–Holland Publishing Company. 1982.

*Primary Examiner*—Wayne Langel
*Attorney, Agent, or Firm*—Thomas E. McDonnell; Ralph T. Webb

[57] ABSTRACT

Near net-shapeable nanostructured ceramic nitride powder and a process for producing the same by nitriding molecular precursor powder in a nitrogen containing atmosphere, e.g., in ammonia, to form nanostructured ceramic nitride powder.

12 Claims, 1 Drawing Sheet

NANOSTRUCTURED CERAMIC NITRIDE POWDERS AND A METHOD OF MAKING THE SAME

BACKGROUND OF THE INVENTION

1. Field of the Invention

The purpose of the present invention is to make nanostructured ceramic nitride powders at low processing temperatures by nitriding molecular precursors in a nitrogen containing environment including ammonia. The resultant nanostructured ceramic nitride powders can be plastically deformed, making them very desirable for thermo-management material, as for example, in electronic applications.

2. Description of the Related Art

Nitrides, such as aluminum nitride, have exceptional electronic and structural properties. Aluminum nitride (AlN) ceramics have exceptional properties for electronic and structural applications. With a high thermal conductivity and electrical resistivity, a permittivity almost the same as alumina and a low thermal expansion, AlN ceramics are attractive materials for electronic substrates.

Most advanced functional and structural ceramic parts are fabricated by consolidation and densification of powders. For this purpose it is desirable that the starting powders have a small particle size (preferably submicron) and a controlled size distribution.

There has therefore been a growing interest in nanoscale ceramic powders (particle diameter <1000 nm and preferably less than 100 nm), and in the possibility of consolidating these nanoscale ceramic particles to full density utilizing lower processing pressures and temperatures than those required using conventional larger diameter powders.

There has also been a growing interest in the possibility of processing bulk ceramics consisting of consolidated nanoscale particles using near net-shape forming techniques, embossing or pressing rather than grinding, cutting or etching, because of the enhanced ductility of small-grain solids.

Currently, ceramic powders with sizes which are several microns or larger cannot be used in near net-shape forming due to the brittle nature of densified bulk material. Near net-shape forming is forming a product to a final shape by using an appropriate die in a pressure-assisted, thermally activated consolidation process. If a ceramic part having a complex geometry can be formed to near net-shape during processing, the conventional methods of costly precision machining can be avoided.

Nanostructured powders have been prepared by physical vapor deposition, mechanical blending and mixing, and by using chemical routes. However, vapor methods are not cost effective and are used to make small amounts of material. The mechanical blending route often introduces impurities into the final product.

Industrial AlN has been produced by the reaction of nitrogen with aluminum or by the carbothermal reduction of alumina. However, in these processes, the precursor powders are typically very large (i.e., −325 mesh, 45 microns or smaller) and the final powders are not suitable for near net-shape forming. Additionally, these processes require the use of temperatures as high as 2000° C. The resulting material needs to be milled in order to obtain the final finer powder. The milling process generates powders with a wide size distribution and impurities from the mill. While the carbothermal process produces a smaller grain sized material than the direct nitridation of Al, it leaves carbonaceous material mixed with the AlN which needs to be removed.

Other approaches for AlN synthesis include vapor deposition and conversion of chemically derived precursors such as metallo-organic or sol-gel derived. By using chemical methods, composites exhibiting molecular and homogeneous mixing may result. Nanocomposite powders of AlN-BN derived by the pyrolysis of a precomposite gel prepared from an aqueous solution containing the constituent salts have also been studied by Chow et al. Tuesel and Russel have shown that coatings of AlN on SiC can be prepared by the pyrolysis of a polymeric polyiminoalane precursor at 900° C. in ammonia.

It is therefore an object of the present invention to provide a process for making nanostructured aluminum nitride powders in bulk quantity.

It is another aspect of the present invention to provide a process for making nanostructured aluminum nitride powders that can be formed into dense AlN substrates by near net-shape forming.

It is another object of the present invention to produce large quantities of material while achieving chemical homogeneity due to the mixing of constituents at the molecular or atomic level.

It is another object of the present invention to provide a process for forming nanostructured aluminum nitride powders utilizing lower temperatures.

It is yet another object of the present invention to provide a process for making aluminum nitride powders utilizing chemical routes which do not require extensive processing equipment, keeping the cost of production low.

SUMMARY OF THE INVENTION

The present invention provides a method for making nanostructured ceramic nitride powders comprising making a precursor powder by making a slurry or solution containing an appropriate precursor and suspending it in absolute ethanol or other suitable solvent while stirring to create a suspension, followed by making a solution of excess water in ethanol or other suitable solvent, forming an aerosol with the ethanol water solution utilizing nitrogen or air, and spraying the aerosol into the suspension, extracting any excess water, to form ceramic precursor powder which is then subjected to a nitrogen containing atmosphere, e.g., ammonia, to form a nanostructured ceramic nitride powder.

The resultant nanostructured ceramic nitride powder has a grain size ranging from 10 nm to 100 nm. The nanostructured ceramic nitride also has a narrow size distribution and uniform agglomerate formation. Nanostructured nitride powder of Al, Si, Ti, and Zr can be made at temperatures less than 1000° C.

DETAILED DESCRIPTION OF THE PREFERRED EMBODIMENTS

Figure 1:
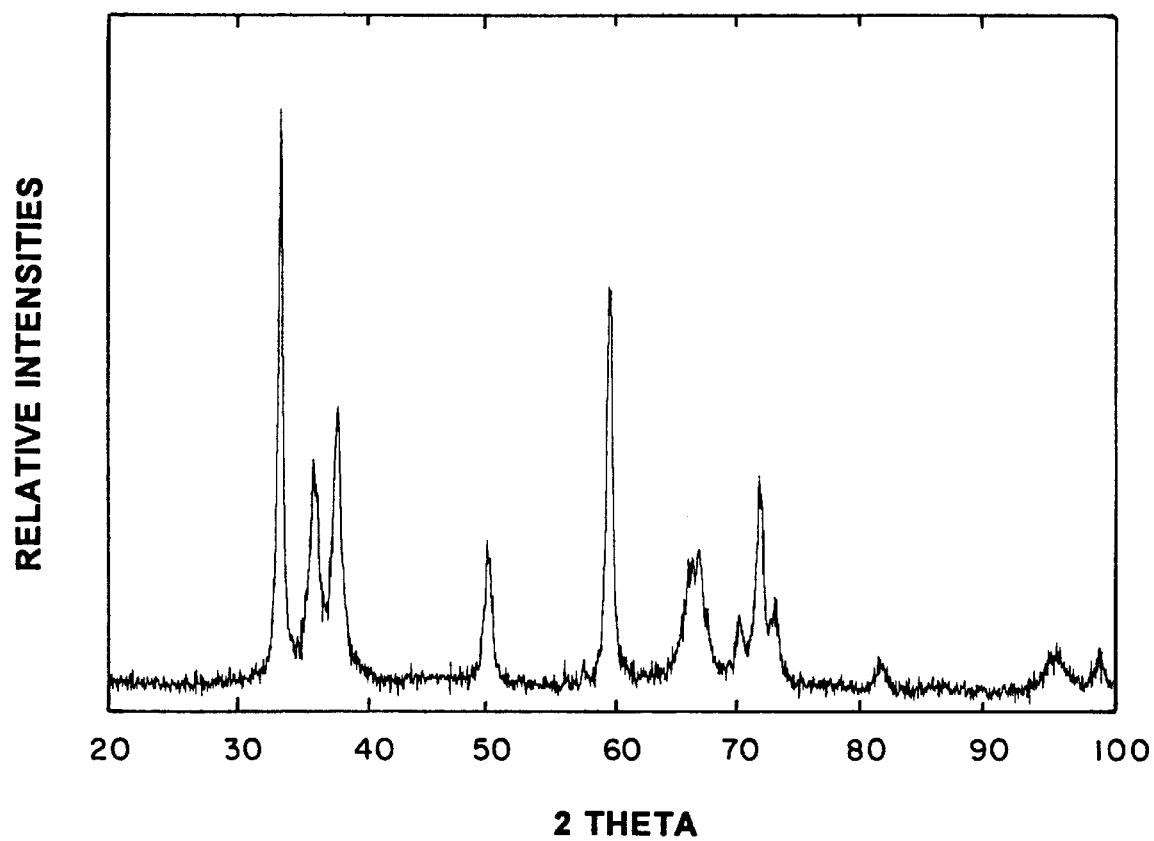
FIG. 1 is a x-ray diffraction pattern of the nanostructured AlN powder according to the present invention.

The present invention is directed to a process for making bulk quantities of nanostructured ceramic nitride powders at lower processing temperatures utilizing nitride molecular precursors in a nitrogen containing environment including ammonia. In particular, the present invention relates to a process for making a nanostructured nitride powder comprising the steps of suspending a precursor for making a precursor powder in a first solvent while stirring, to form a suspension, making a solution of water and a second solvent into an aerosol with nitrogen or air, wherein the first solvent and the second solvent may be the same or different, spraying the aerosol into the suspension, recovering a precipitate, drying the precipitate to form the precursor powder, calcining the precursor powder at a temperature ranging from 200° C. to 1000° C. for a period of time ranging from 30 minutes to 10 hours, and thermally treating the calcined precursor powder in a nitrogen containing atmosphere, preferably containing ammonia, at a temperature ranging from 500° C. to 1100° C. to form the nanostructured nitride powder.

As used herein, the term "precursor" refers to the starting material for the process of the present invention. The term "precursor powder" refers to the powder obtained by treating the precursor to the steps of suspending the precursor in the first solvent, spraying the aerosol into the suspension, stirring the suspension, filtering the suspension to recover a precipitate and drying the precipitate. The precursor used in the present invention is any compound capable of forming a precursor powder that can be nitrided according to the process of the invention by reacting with ammonia to form a nitride powder. Preferably, the precursor is a salt containing aluminum, silicon, titanium or zirconium. Most preferably, the precursor is an alkoxide containing aluminum, silicon, titanium or zirconium.

For making aluminum nitride powders, preferred precursors include aluminum tri-sec-butoxide, aluminum isopropoxide, aluminum nitrate, aluminum chloride (both anhydrous and hydrated), aluminum sulfate, aluminum ethoxide, aluminum citrate, aluminum acetate, aluminum carbonate, aluminum ammonium sulfate, aluminum n-butoxide, aluminum t-butoxide, aluminum di(sec-butoxide)acetoacetic ester, aluminum hydroxide, aluminum lactate, aluminum methoxide, aluminum oxide colloid, aluminum 2,4-pentanedionate, aluminum monohydroxide (boehmite), aluminum oxalate and aluminum propoxide.

For making silicon nitride powders, preferred precursors include tetraethylorthosilicate, tetramethylorthosilicate, silicon tetrachloride, silicon (IV) acetate, tetrabutoxysilane, tetradecyloxysilane, triphenylsilanol, vinyl triethoxysilane, vinyl trimethoxysilane, tetramethyldivinylsiloxane.

For making titanium nitride powders, preferred precursors include titanium (IV) isopropoxide, titanium (IV) ethoxide, titanium (III) chloride, titanium (IV) chloride, titanium (IV) butoxide, titanium (IV) propoxide, titanium (IV) methoxide, titanium (III) nitrate, titanium (IV) 2-ethylethoxide.

For making zirconium nitride powders, preferred precursors include zirconium n-propoxide, zirconium acetate, zirconium (IV) acetylacetonate, zirconium (IV) chloride, zirconium (IV) butoxide, zirconium (IV) t-butoxide, zirconium (IV) ethoxide, zirconium (IV) propoxide, zirconyl chloride hydrate, and zirconyl nitrate.

The first solvent is any solvent in which the precursor is able to form a suspension. The second solvent is any solvent capable of forming a solution with water that can be made into an aerosol with nitrogen or air. The first and second solvents may be the same or different and are preferably organic solvents selected from the group consisting of ethanol, methanol, 1-butanol, 2-butanol, t-butanol, ethylene glycol, 2-methoxyethanol, glycerol, 2-(methylamino) ethanol, methylvinyl ketone, propylene carbonate, 2-methyl-1-propanol, 2-methyl-2-propanol, 1,2-butanediol, 1,3-butanediol, 2,3-butanediol, 1,4-butanediol, 2-ethoxyethanol, 1-methoxy-2-propanol, cyclopentanol, 1-pentanol, 2-pentanol, 3-pentanol, acetone, cyclohexane, hexane, heptane, propanol, cyclohexanol, 2-hexanol, 3-hexanol, 1-heptanol, 2-heptanol, 3-heptanol, 1-octanol, 2-octanol, 3-octanol, isopropanol, acetonitrile, methylene chloride, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol and sec-butanol. The first solvent may also be water. Most preferably, the first solvent and the second solvent are both ethanol.

Preferably, the water used to form the aerosol is distilled and deionized water (DDW).

Specific examples of precursors for making a precursor powder for making aluminum nitride powders according to present invention include aluminum tri-sec-butoxide (ASB), aluminum isopropoxide, aluminum chloride, aluminum nitrate, and aluminum hydroxide hydrate, purchased from the Aldrich Chemical Co., Milwaukee, Wis. Gamma aluminum oxide, 99.97%, was purchased from Johnson Matthey, Wad Hill, Mass. Nanocrystalline alpha aluminas were purchased from Cerac, Milwaukee, Wis. and Sumitomo (AKP-50), Japan. Other examples of precursors that can be utilized in the present invention are named above.

For some precursors, further preparation may be necessary before the precursor is used according to the present invention. For example, when aluminum tri-sec-butoxide is chosen as the precursor for making the precursor powder, hydrolysis of aluminum tri-sec-butoxide is conducted, with and without excess water.

When aluminum hydroxide hydrate is chosen as the precursor for making the precursor powder, the synthesis of aluminum hydroxide is conducted by precipitation under basic conditions (pH>7, usually pH=8 or 10). The hydrolysis of the alkoxide is done at room temperature to favor precipitate formation instead of sol formation.

An exemplary synthesis is described as follows, using aluminum tri-sec-butoxide as the chosen precursor for making the precursor powder, using absolute ethanol as the first and second solvents and using distilled and deionized water in forming the aerosol.

The aluminum tri-sec-butoxide is suspended in absolute ethanol at a temperature between 1° C. to 100° C. while stirring. A water solution of distilled deionized water (DDW)-ethanol (ratio of molar concentration of water to alumina is from 1 to 500) is made into an aerosol with nitrogen and sprayed into the alkoxide suspension.

The reactants are stirred for an additional 30 minutes after the addition of the water solution. The solvents are removed from as-prepared precipitates by any means known for recovering a precipitate including air drying (3–5 days), filtering (5–8 hours), under vacuum in a rotary evaporator (1–3 hours) or centrifugation.

The precipitates are then redispersed in an ethanol-water solution, washed with isopropanol and the drying process repeated.

The dry precursor powders are preferably less than 20 nm in size, and more preferably from 0.1 nm to 5 nm. The dry precursor powders are calcined at temperatures ranging from 200° C. to 1000° C. from 30 minutes to 10 hours to remove the organic moieties. The precursor powders are then thermally treated in a liquid or gaseous nitrogen-containing environment. The thermal treatment may be carried out by any heating means known in the art, including a rotating furnace, a non-rotating furnace, or other known heat source. Preferably, the calcined powders are sieved to −325 mesh and then placed into a rotating furnace and thermally treated in ammonia at temperatures ranging from 500° C. to 1100° C., from 6 to 12 hours.

The resultant aluminum nitride powders were agglomerates of nanocrystallites of AlN having an average agglomerate size of 200 nm. The structure of the AlN powders was confirmed by electron diffraction and lattice imaging using transmission electron microscopy and high resolution transmission electron microscopy. From x-ray line broadening and TEM studies, the crystallite size of the AlN powders was about 30 nm.

FIG. 1 shows the XRD pattern of the nitrided powders produced by the hydrolysis of the alkoxide according to the present invention. The alkoxide route produces poorly crystallized precursor powder, which remains relatively amorphous after calcining at 400° C. for 2 hours.

When nitrate was used as the aluminum source, the as-prepared precursor powders were crystalline bayerite. Calcining these powders yielded the eta phase of alumina.

Chloride synthesis resulted in the boehmite phase of AlOOH, and upon calcination at 400° C. the gamma phase began to appear. However, the boehmite phase was still detected.

Table I below summarizes the structure-processing relationship of the precursor powders and the nitridation results of these powders as well as some commercially available fine-grained aluminas. The commercially available coarse and fine grained aluminas could not be successfully nitrided under these conditions (see Table I).

The problem of inferior heat conductivity is also overcome if the fully dense nanostructured ceramic is annealed to allow for grain growth to occur, and the decrease in grain boundaries will result in the restoration of bulk thermal conductivity.

The nanostructure nitride powder produced according to the present invention has a narrow size distribution.

Having described the invention, the following examples are given to illustrate specific applications of the invention, including the best mode now known to perform the invention. These specific examples are not intended to limit the scope of the invention described in this application.

EXAMPLE

Aluminum tri-sec-butoxide was suspended in absolute ethanol while stirring. A solution of distilled deionized water-ethanol (excess water) was made into an aerosol with nitrogen and sprayed into the organo-aluminum suspension. The reactants were stirred for 30 minutes after the addition of the water solution, and then filtered and washed with water. Once the precursor was filtered and dried in air, it was then ground using a mortar and pestle. The precursor powder was then calcined at 400° C. for 2 hours to remove the organic moieties. The calcined powders were then placed into a furnace and thermally treated in ammonia. The precursor and final powders were characterized using X-ray diffraction (XRD), scanning electron microscope (SEM), transmission electron microscopy (TEM) and high resolution TEM (HRTEM). Nanocrystalline AlN powders were formed.

TABLE 1

| Aluminum Source | XRD results of as-prepared material | XRD results of calcined material | Nitridation conditions (°C./hr) | XRD results of nitrided material |
|---|---|---|---|---|
| Aluminum tri-sec-butoxide | amorphous | amorphous/gamma | 1000/10 | AlN |
|  | amorphous | amorphous/gamma | 1100/10 | AlN |
| aluminum chloride | boehmite | boehmite/gamma | 1000/10 | AlN AlO3N |
| aluminum nitrate nonahydrate | bayerite | eta | 1000/10 | theta AlN |
| aluminum hydroxide hydrate | amorphous |  | 1000/10 | gamma AlN |
| gamma alumina (Cerac) | gamma |  | 1000/10 | delta aluminum oxide nitride gamma |
| nano-alpha alumina (Johnson Matthey) | alpha |  | 1000/10 | alpha |
| Sumitomo AKP-50 | alpha |  | 1000/10 | alpha |

According to the present invention, resultant nanostructured ceramic particles are produced which can be formed into dense substrates, preferably comprising AlN, $Si_3N_4$, TiN, or ZrN using near net-shape forming.

The resultant substrate, if consolidated by pressureless sintering, experiences inferior thermal conductivity compared to its counterpart substrate having larger particles because of the larger volume of grain boundaries in nanostructured ceramics which increases the scattering of phonons which leads to a decrease in its thermal conductivity, and also because of porosities, since the sample is not fully dense. However, using other consolidation techniques, particularly pressure-assisted sintering consolidation techniques including heat and shear stress consolidation, a dense sample can be obtained.

The process according to the present invention enables the ability to produce larger quantities of material while achieving better chemical homogeneity due to the mixing of the constituents at the molecular or atomic level.

In addition, the process of the present invention does not require extensive processing equipment and the cost of production can be relatively low.

The process of the present invention allows for the synthesis of pure ceramic oxide and conversion to nanoscale nitride films and powders at much lower temperatures utilizing a simple and inexpensive process.

The nanostructured aluminum nitride powders formed from the process according to the present invention impart unique properties in that the smaller particles can arrange themselves so that they can be plastically deformed at lower temperatures as compared to conventional aluminum nitride ceramic substrates. Since a more ductile material is provided, complex geometries can be fabricated without the need for careful machining.

Furthermore, if the grain size is desired to be changed, after the substrate is made, it can placed in the furnace to obtain a larger grain size so that the properties enjoyed by a larger grain size ceramic can be achieved.

Various modes of carrying out the invention will be evident to those skilled in the art without departing from the spirit and scope of the present invention as defined in the claims.

We claim:

1. A process for making a nanostructured nitride powder comprising the steps of:
    suspending a precursor for making a precursor powder in a first solvent, to form a suspension,
    making a solution of water and a second solvent into an aerosol with nitrogen or air, wherein the first solvent and the second solvent may be the same or different,
    spraying said aerosol into said suspension,
    recovering a precipitate from said suspension,
    drying said precipitate to form said precursor powder,
    calcining said precursor powder at a temperature ranging from 200° C. to 1000° C. for a period of time ranging from 30 minutes to 10 hours, and
    thermally treating said calcined precursor powder in nitrogen-containing atmosphere at a temperature ranging from 500° C. to 1100° C. to form said nanostructured nitride powder.

2. The process according to claim 1, wherein said precursor is selected from the group consisting of aluminum tri-sec butoxide, aluminum isopropoxide, aluminum nitrate, aluminum chloride, aluminum sulfate, aluminum ethoxide, aluminum citrate, aluminum acetate, aluminum carbonate, aluminum ammonium sulfate, aluminum n-butoxide, aluminum t-butoxide, aluminum di (sec-butoxide)acetoacetic ester, aluminum hydroxide, aluminum lactate, aluminum methoxide, aluminum oxide colloid, aluminum 2,4-pentanedionate, aluminum monohydroxide (boehmite), aluminum oxalate, and aluminum propoxide.

3. The process according to claim 1, wherein said precursor is selected from the group consisting of tetraethylorthosilicate, tetramethylorthosilicate, silicon tetrachloride, silicon (IV) acetate, tetrabutoxysilane, tetradecyloxysilane, triphenylsilanol, vinyl triethoxysilane, vinyl trimethoxysilane, and tetramethyldivinylsiloxane.

4. The process according to claim 1, wherein said precursor is selected from the group consisting of titanium (IV) isopropoxide, titanium (III) chloride, titanium (IV) chloride, titanium (IV) butoxide, titanium (IV) ethoxide, titanium (IV) propoxide, titanium (IV) methoxide, titanium (III) nitrate, and titanium (IV) 2-ethylethoxide.

5. The process according to claim 1, wherein said precursor is selected from the group consisting of zirconium n-propoxide, zirconium acetate, zirconium (IV) acetylacetonate, zirconium (IV) chloride, zirconium (IV) butoxide, zirconium (IV) t-butoxide, zirconium (IV) ethoxide, zirconium (IV) propoxide, zirconyl chloride hydrate, and zirconyl nitrate.

6. The process according to claim 1, wherein said first solvent is selected from the group consisting of ethanol, methanol, 1-butanol, 2-butanol, t-butanol, ethylene glycol, 2-methoxyethanol, glycerol, 2-(methylamino)ethanol, methylvinyl ketone, propylene carbonate, 2-methyl-l-propanol, 2-methyl-2-propanol, 1,2-butanediol, 1,3-butanediol, 2,3-butanediol, 1,4-butanediol, 2-ethoxyethanol, 1-methoxy-2-propanol, cyclopentanol, 1-pentanol, 2-pentanol, 3-pentanol, acetone, cyclohexane, hexane, heptane, propanol, cyclohexanol, 2-hexanol, 3-hexanol, 1-heptanol, 2-heptanol, 3-heptanol, 1-octanol, 2-octanol, 3-octanol, isopropanol, acetonitrile, methylene chloride, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-l-pentanol, 4-methyl-2-pentanol, water, and sec-butanol.

7. The process according to claim 1, wherein the second solvent is selected from the group consisting of ethanol, methanol, 1-butanol, 2-butanol, t-butanol, ethylene glycol, 2-methoxyethanol, glycerol, 2-(methylamino)ethanol, methylvinyl ketone, propylene carbonate, 2-methyl-1-propanol, 2-methyl-2-propanol, 1,2-butanediol, 1,3-butanediol, 2,3-butanediol, 1,4-butanediol, 2-ethoxyethanol, 1-methoxy-2-propanol, cyclopentanol, 1-pentanol, 2-pentanol, 3-pentanol, acetone, cyclohexane, hexane, heptane, propanol, cyclohexanol, 2-hexanol, 3-hexanol, 1-heptanol, 2-heptanol, 3-heptanol, 1-octanol, 2-octanol, 3-octanol, isopropanol, acetonitrile, methylene chloride, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, and sec-butanol.

8. The process of claim 1, wherein said step of recovering a precipitate from said suspension is carried out by filtering said suspension.

9. The process of claim 1, wherein the step of suspending the precursor for making a precursor powder in a first solvent is carried out at a temperature between 10° C. and 1000° C.

10. The process of claim 1 wherein said nitrogen containing atmosphere includes ammonia.

11. A process for making a nanostructured nitride powder comprising the steps of:
    suspending a precursor selected from the group consisting of aluminum tri-sec-butoxide, aluminum isopropoxide, aluminum nitrate, anhydrous aluminum chloride, hydrated aluminum chloride, aluminum sulfate, aluminum ethoxide, aluminum citrate, aluminum acetate, aluminum carbonate, aluminum ammonium sulfate, aluminum n-butoxide, aluminum t-butoxide, aluminum di(sec-butoxide)acetoacetic ester, aluminum hydroxide, aluminum lactate, aluminum methoxide, aluminum oxide colloid, aluminum 2,4-pentanedionate, aluminum monohydroxide (boehmite), aluminum oxalate, aluminum propoxide, tetraethylorthosilicate, tetramethylorthosilicate, silicon tetrachloride, silicon (IV) acetate, tetrabutoxysilane, tetradecyloxysilane, triphenylsilanol, vinyl triethoxysilane, vinyl trimethoxysilane, tetramethyldivinylsiloxane, titanium isopropoxide, titanium ethoxide, titanium chloride, zirconium propoxide, zirconium butoxide, zirconyl nitrate, titanium (IV) isopropoxide, titanium (III) chloride, titanium (IV) chloride, titanium (IV) butoxide, titanium (IV) ethoxide, titanium (IV) propoxide, titanium (IV) methoxide, titanium (III) nitrate, titanium (IV) 2-ethylethoxide, zirconium n-propoxide, zirconium acetate, zirconium (IV) acetylacetonate, zirconium (IV) chloride, zirconium (IV) butoxide, zirconium (IV) t-butoxide, zirconium (IV) ethoxide, zirconium (IV) propoxide, zirconyl chloride hydrate, and zirconyl nitrate in a first solvent selected from the group consisting of ethanol, methanol, 1-butanol, 2-butanol, t-butanol, ethylene glycol, 2-methoxyethanol, glycerol, 2-(methylamino)ethanol, methylvinyl ketone, propylene carbonate, 2-methyl-1-propanol, 2-methyl-2-propanol, 1,2-butanediol, 1,3-butanediol, 2,3-butanediol, 1,4-butainediol, 2-ethoxyethanol, 1-methoxy-2-propanol, cyclopentanol, 1-pentanol, 2-pentanol, 3-pentanol, acetone, cyclohexane, hexane, heptane, propanol, cyclohexanol, 2-hexanol, 3-hexanol, 1-heptanol, 2-heptanol, 3-heptanol, 1-octanol, 2-octanol, 3-octanol, isopropanol, acetonitrile, methylene chloride, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, water, and sec-butanol, to form a suspension, making a solution of water and a second solvent selected from the group consisting of ethanol, methanol, 1-butanol, 2-butanol, t-butanol, ethylene glycerol, 2-methoxyethanol, glycol, 2-(methylamino)ethanol, methylvinyl ketone, propylene carbonate, 2-methyl-1-propanol, 2-methyl-2-propanol, 1,2-butanediol, 1,3-butanediol, 2,3-butanediol, 1,4-butainediol, 2-ethoxyethanol, 1-methoxy-2-propanol, cyclopentanol, 1-pentanol, 2-pentanol, 3-pentanol, acetone, cyclohexane, hexane, heptane, propanol, cyclohexanol, 2-hexanol, 3-hexanol, 1-heptanol, 2-heptanol, 3-heptanol, 1-octanol, 2-octanol, 3-octanol, isopropanol, acetonitrile, methylene chloride, 2-methyl-1-pentanol, 2-methyl-2-pentanol, 2-methyl-3-pentanol, 3-methyl-1-pentanol, 3-methyl-2-pentanol, 3-methyl-3-pentanol, 4-methyl-1-pentanol, 4-methyl-2-pentanol, and sec-butanol into an aerosol with nitrogen or air, wherein the first solvent and the second solvent may be the same or different, spraying said aerosol into said suspension, recovering a precipitate from said suspension, drying said precipitate to form a precursor powder, calcining said precursor powder at a temperature ranging from 200° C. to 1000° C. for a period of time ranging from 30 minutes to 10 hours, and thermally treating said calcined precursor powder in an atmosphere including ammonia at a temperature ranging from 500° C. to 1100° C. to form said nanostructured nitride powder.

12. A process for making a nanostructured nitride powder comprising the steps of suspending a precursor for making a precursor powder in a first solvent while stirring, to form a suspension, making a solution of distilled deionized water and a second solvent into an aerosol with nitrogen, wherein the first solvent and the second solvent may be the same or different, spraying said aerosol into said suspension, stirring said suspension after the spraying step, recovering a precipitate from said suspension, drying said precipitate to form said precursor powder, calcining said precursor powder at a temperature ranging from 200° C. to 1000° C., from 30 minutes to 10 hours, and thermally treating said calcined precursor powder in a nitrogen-containing atmosphere including ammonia at a temperature ranging from 500° C. to 1100° C., to form said nanostructured nitride powder.

* * * * *